(12) United States Patent
Rooney

(10) Patent No.: US 7,355,974 B2
(45) Date of Patent: Apr. 8, 2008

(54) METHOD FOR FORWARDING DATA PACKETS BY A ROUTER

(75) Inventor: Sean G. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 10/768,853

(22) Filed: Jan. 30, 2004

(65) Prior Publication Data

US 2005/0041674 A1 Feb. 24, 2005

(30) Foreign Application Priority Data

Jan. 27, 2003 (EP) .................... 0340534

(51) Int. Cl.
*H04L 12/26* (2006.01)
*H04L 12/28* (2006.01)
*G06F 15/16* (2006.01)

(52) U.S. Cl. .............. 370/235; 370/389; 709/246

(58) Field of Classification Search .......... 370/235, 370/389, 390, 392, 400, 401, 432, 477; 709/246, 709/247

See application file for complete search history.

(56) References Cited

U.S. PATENT DOCUMENTS

| | | | | |
|---|---|---|---|---|
| 5,485,455 A | * | 1/1996 | Dobbins et al. | 370/255 |
| 6,309,424 B1 | * | 10/2001 | Fallon | 341/51 |
| 6,618,397 B1 | * | 9/2003 | Huang | 370/474 |
| 6,882,637 B1 | * | 4/2005 | Le et al. | 370/349 |
| 7,126,952 B2 | * | 10/2006 | Hooper et al. | 370/401 |
| 2005/0195750 A1 | * | 9/2005 | Le et al. | 370/252 |
| 2006/0067219 A1 | * | 3/2006 | Dougall et al. | 370/230 |

* cited by examiner

*Primary Examiner*—Wing Chan
*Assistant Examiner*—Hong Sol Cho
(74) *Attorney, Agent, or Firm*—Douglas W. Cameron (57) ABSTRACT

The invention describes a method for transmitting data packets by a router, whereby the ports of the router are assigned to affinity values. The data packets also comprise affinity values. Depending on a match of the affinity values of the data packets and the affinity values of the ports, the router forwards the data packets to selected ports. Furthermore, the data of the payload of the data packets are attenuated depending on the affinity value that is used for selecting the port.

11 Claims, 4 Drawing Sheets

METHOD FOR FORWARDING DATA PACKETS BY A ROUTER

FIELD OF THE INVENTION

The present invention relates to a method for forwarding data packets by a router. More particularly, the present invention relates to a method and a router for handling information exchange via networks.

DESCRIPTION OF THE PRIOR ART

Routers are used in packet-switched networks for forwarding data between different sub-networks. In a packet-switched network, data is divided up into small pieces called packets, whereby each of the packets is transferred independently via the network. In a process called "store and forward", each packet is temporarily stored at each intermediate node, then forwarded when the next link becomes available. Each packet may take a different path through the network in a connection-less or datagram scheme.

A data packet is routed through the network primarily according to its destination address. In order to determine the correct next router, the router compares the destination address with a look-up table which shows the best next hop router to get to that address. This in turn determines through which physical port the packet should be transmitted when leaving the router. The destination address of the packet is stored in a packet header. The packet header is a part of the packet and contains a source address as well as a destination address, a checking sum and other fields.

The amount of data packet traffic being communicated over communication networks has increased exponentially, especially on the Internet, a well-known member of the family of connection-less packet-switched networks. In some circumstances, the data packet traffic reaches such a level that conventional routers operate at their limit. Since the performance of a router is crucial to the number of packets that can be transmitted via a communication network or from one communication network to another one, a slow router can cause a delay and loss of data packets.

SUMMARY OF THE INVENTION

It is an object of the present invention to provide a method for forwarding data packets by a router and a router that allow a more efficient use of the data transmitting capacity of a network.

A further object of the invention is to provide a method for forwarding data packets by a router and a router that allow a more flexible use of the network.

It is a further object to provide an enhanced method for forwarding data packets by a router.

This and other objects are accomplished by the method for forwarding data packets by a router according to claim 1, by the network according to claim 11, by the router according to claim 12 and by the data packet according to claim 13.

One advantage of the present invention is that the capacity for transmitting data is more efficiently used. This advantage is achieved by a method for forwarding data packets by a router, whereby the router attenuates the data of the data packet if the data packet comprises an affinity value. The router forwards the attenuated data packet to a receiver, i.e. a router or a host, that is determined by the affinity value of the data packet. Since the data of the data packet is attenuated i.e. preferably reduced in size, less data has to be transmitted and less capacity for transmitting the data packets is required. Therefore, more data packets can be transmitted over the network.

Single steps of the proposed method can be interchanged in order where reasonable.

The invention has the advantage that the amount of data forwarded by a router is reduced and a further hierarchy of subgroups is implemented by using the affinity values. The hierarchy could be used for delivering different information to different subgroups of a multi-cast group, whereby the multi-cast group is assigned to one IP address.

A further advantage of the present invention is that the inventive method uses affinity values in order to determine whether a data packet is sent to a router or not.

Furthermore, it is of advantage to use the different affinity values to determine different attenuation levels. The different attenuation levels have the advantage that depending on the routes determined by the affinity values, different parts of the data of a data packet are transmitted over the routes. This is of advantage when there are different classes of information levels. Depending on the class, the data that is transmitted to the destination address is determined by the level of information that is given by the affinity value. Using this new system, different groups can be formed, even for one IP address.

Preferably, a receiver is another router or a host. Such receiver of a data packet can be determined according to a destination address that is part of the received data packet and according to a routing table that shows next hop routers to forward the data packet to in order to reach its final destination. When the destination host can be reached directly from the router without intermediate router, the determined receiver is preferably the host itself.

In a preferred embodiment, the affinity values of the receivers, i.e. next routers or hosts are stored in a table and the router compares the affinity value of the data packet with the affinity values of the table and chooses the receivers that have the same affinity value as the data packet. Then the router forwards the data packet to one or more of the chosen receivers. This is a simple and easy way to determine the receivers by which the attenuated data packets are forwarded.

If no receiver with the same affinity value as the attenuated data packet is found, the router preferably does not forward the data packet to any receiver but drops the data packet.

A further advantage of the invention is that using the affinity values, different qualities of data can be selected. For example, if a data packet comprises video data and audio data, then the data packet could use a first affinity value for the video and a second affinity value for the audio data. Depending on the affinity values of the receivers, the complete data comprising the audio and the video data or only the video or only the audio data could be transmitted to the receivers. If the destination address is a radio receiver that only uses audio data, it is not necessary to transmit the video data to the radio receiver. If a television system is used as receiver, it is advantageous that the audio and the video data can be transmitted to the television system. On the other hand, if the audio data is provided in different languages, e.g. in Europe German, English and French, then transmitting only one of the languages could be determined by the affinity value.

A preferred embodiment of the invention is its use in a computer game that is played within a network of players that are connected by routers. Different affinity values can be assigned to different players, such that different qualities of information or different information can be transmitted to different players by the router.

In a preferred embodiment an UDP checksum is used in order to recognize whether the data packet could be attenuated or not. For this the data packet comprises an AP checksum that is calculated in such a way that the UDP checksum has a predetermined value, i.e. zero, if the data packet should be marked as an attenuable data packet. This method has the advantage that the UDP checksum does not have to be changed.

BRIEF DESCRIPTION OF THE DRAWINGS

For a better understanding of the present invention, together with other and further features and advantages thereof, reference is made to the following description, taken in conjunction with the accompanying drawings.

DETAILED DESCRIPTION OF THE INVENTION

Figure 1:
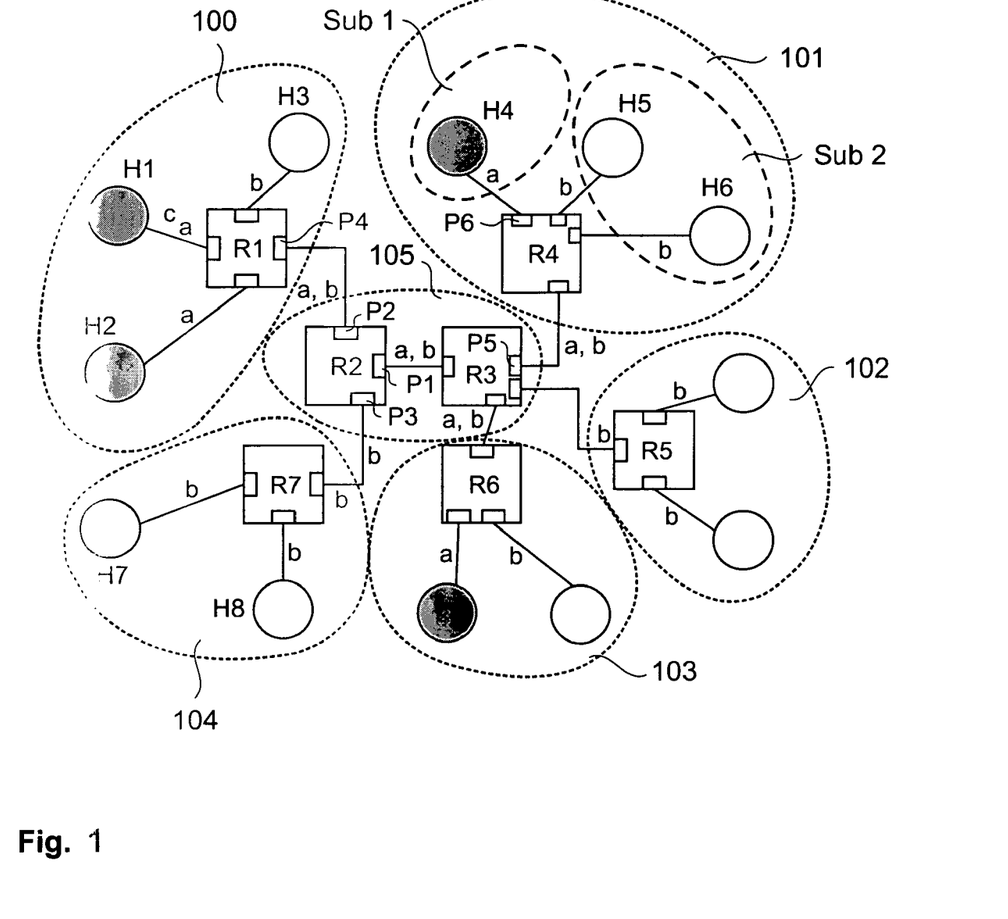
FIG. 1 shows a schematic view of a communication system to be used with the present invention.

With reference to FIG. 1, a schematic view of a communication system that is used with the present invention is depicted. The communication system comprises a plurality of interconnected sub-networks that are connected to each other by at least one data connection. In FIG. 1, a first, second, third, fourth, fifth and a sixth sub-network 100, 101, 102, 103, 104 and 105 are shown. The first to fifth sub-networks are local area networks and the sixth sub-network 106 is a wide area network, for example the global Internet. The sub-networks are connected to each other by a router, R1, R2, R3, R4, R5, R6, R7. The wide area sub-network itself might consist of more than one sub-network interconnected by a plurality of routers. The first local area sub-network 100 comprises a first, a second and a third host H1, H2, H3. The first, the second and the third hosts are connected to a first router R1. The second local area sub-network 101 comprises a fourth, a fifth and a sixth host, H4, H5, H6. The fourth, the fifth and the sixth hosts are connected to a fourth router R4. The routers are connected to the hosts H1, H2, H3, H4, H5, H6 or to other routers R2, R3.

Figure 2:
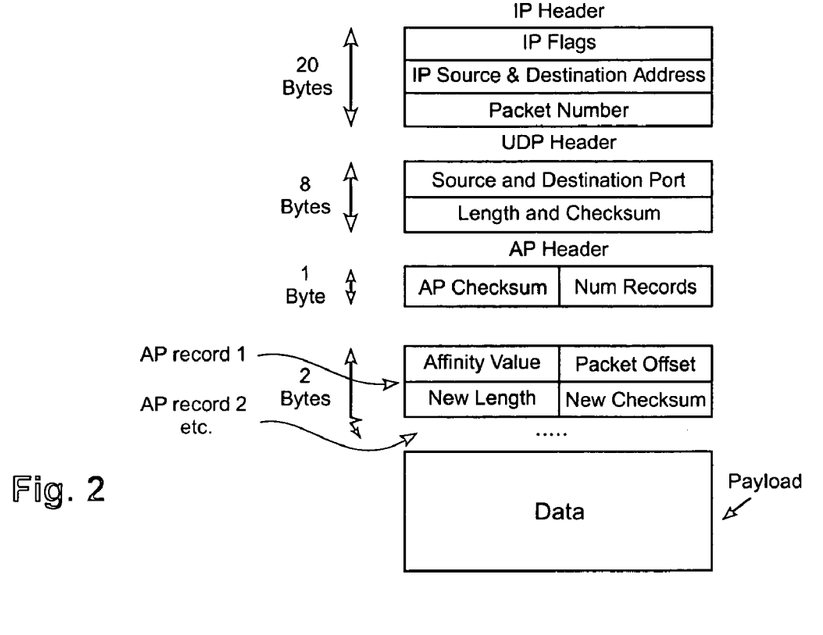
FIG. 2 shows in a schematic view the parts of the data packets that are of interest for understanding the invention.

If data is transmitted between hosts or routers, the data is divided up into data packets as shown in FIG. 2. If the first host H1 of the first sub-network 100 transmits data to the fourth host H4 of the second sub-network 101, the data packets are sent to the first router R1. The first router R1 transmits the data packets to the second router R2. The second router R2 transmits the data packets the third router R3. The third router R3 transmits the data packets to the fourth router R4. The fourth router R4 transmits the data packets to the fourth host H4.

FIG. 2 shows a data packet that uses an IP protocol and a UDP protocol for being transmitted. The data packet comprises an IP header with an IP source address and an IP destination address. If the data is to be transmitted from the first host H1 to the fourth host H4, the IP source address is the IP address of the first host H1. The destination address for the data packets is the IP address of the fourth host H4. The UDP header comprises a source port address and a destination port address.

The IP header and the UDP header are well-known in the prior art. As a new feature, a data packet comprises an AP record with an AP header. The AP header comprises an AP checksum which is necessary for using an attenuation protocol (AP). The AP record comprises an affinity value, a packet offset, a new length and a new check sum. The affinity values a, b could be realized as an integer each. The packet offset determines the data that are attenuated by the router using the affinity value of the AP record. The new length determines the length of the data packet after the attenuation by the router. The new check sum of the AP record is used as the AP check sum of the AP header for the attenuated data packet. Depending on the situation, several affinity values could be used, maybe with different packet offsets.

The AP header comprises an AP checksum and a number record. The AP checksum contains a sixteen-bit identifier. A preferred method for identifying a packet as an attenuable packet is to use the UDP check sum. The UDP check sum is always the complement of the value attained by considering the entire UDP packet (in addition to a pseudo IP header) as a sequence of sixteen bit numbers and adding them up. The host determining whether a packet should be used as an attenuable packet uses the following procedure starting with the greatest attenuation level to the least attenuation level. At a first step, the AP checksum of a first AP record that allows the greatest attenuation is set to 0. Then the UDP check sum is calculated for the resulting packet. Afterwards, the AP checksum is changed to get a UDP check sum which, when calculated, equals 0. The procedure is done for all AP records. The data packet is then transmitted using the newly calculated AP checksums for the AP records.

If a router has to check whether a packet can be attenuated, then the router proceeds along the following function: the router checks whether the data packet comprises a UDP protocol and the router checks whether the UDP check sum of the data packet is 0. If the data packet uses a UDP protocol and the UDP check sum of the data packet is 0, then the router produces a new data packet that equals the former data packet, whereby the AP checksum of an AP record is set to 0. The router then calculates the UDP check sum of the new data packet. The UDP check sum of the new data packet is compared to the AP checksum of the former data packet. If the calculated UDP check sum of the new data packet equals the complement of the AP checksum, then the router detects the former data packet as a data packet that could be attenuated.

This procedure can be carried out for each AP record to determine whether all AP records could be used for attenuating the data packet. Depending on the embodiment of the invention, other methods could also be used for identifying the data packet as an attenuable data packet.

The number in the record field specifies how many AP records with affinity values are contained in the AP header. The data packet of course contains payload that is named data.

The primary function of a router is to examine the destination address of the IP header of the packet against a routing table that comprises addresses of receivers, i.e. next hop routers or next hosts that could be used for sending a data packet to the IP destination address. The table comprises the information which interface cold be used for sending the packet to a specific receiver.

Figure 3:
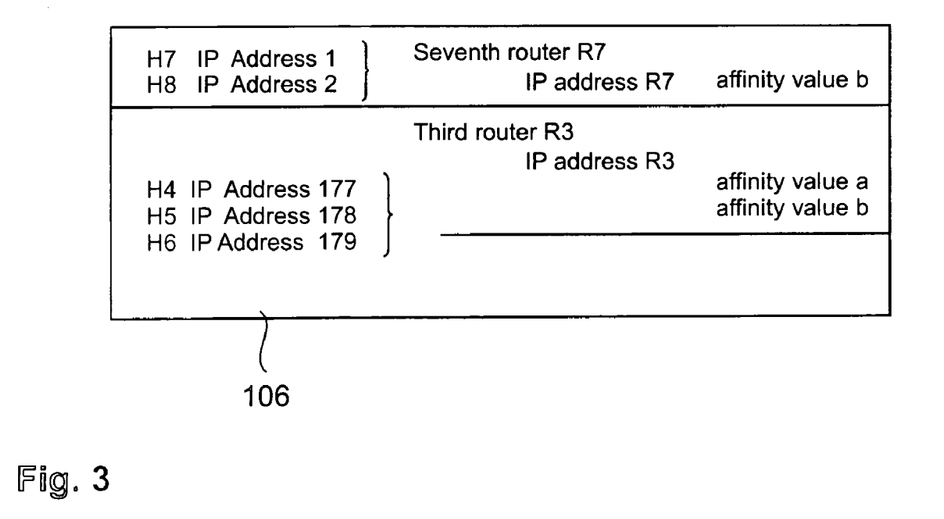
FIG. 3 shows a look-up table for a router.

FIG. 3 shows a routing table 106 of the second router R2. The routing table shows the IP addresses of the fourth, the fifth, the sixth, the seventh and the eighth host, whereby the seventh and the eighth host H7, H8, are connected with the seventh router R7. The seventh host H7 has the IP address 1. The eighth host H8 has the IP address 2. The IP address 1 and the IP address 2 are assigned to the seventh router with the IP address IR7. The seventh router R7 is the next hop router for the second router R2 to transmit a packet to the seventh and eighth host H7, H8 with the IP address 1 or 2. The seventh router R7 is connected with the second router by the third interface P3. The seventh router R7 is assigned to a second affinity value b. The fourth, the fifth and the sixth host H4, H5, H6 comprise the IP addresses 177, 178 or 179. All three IP addresses are assigned to the third router R3. The third router R3 that is connected by the first interface P1 is assigned to a first affinity value a and to the second affinity value b. Depending on the embodiments of the network, there could also be more than one router as next hop router for sending a packet to an IP address. Also, it is not necessary that every router or host is assigned to an affinity value. Furthermore, a receiver, i.e. a router or host could be assigned to more than two affinity values as shown in the example. In a preferred embodiment of the invention all hosts of one sub-network are assigned to one IP address.

If a data packet is received by the second router R2 that comprises as an IP destination address the IP address 1, then the second router R2 looks up its routing table and finds the information that the seventh router R7 could be used for sending a data packet to the IP address 1. The second router R2 determines the third interface P3 to transmit the data packet to the seventh router R7. If the second router R2 receives the data packet that comprises the IP destination address 177, then the second router R2 determines the third router R3 with the IP address R3 for transmitting the data packet. As shown in FIG. 1, all next hop routers or next hosts may also be assigned to at least one affinity value that is depicted as small letter nearby the interfaces.

The affinity values of the data packets are used by the routers for attenuating the data of the data packet. In connection with FIG. 4, new and inventive embodiments of the processing of a router is explained in the following text.

Let us consider the example that the first host H1 sends data to the fourth host H4. In order to do so, the first host H1 divides up the data into data packets as shown in FIG. 2 at program step 200. In the following program step 205, the first host H1 assigns an AP header to the data packet as shown in FIG. 2. The AP header comprises an AP checksum, a number record and one or more AP records. An AP record comprises an affinity value, a packet offset, a new length and a new check sum. The AP checksum contains sixteen bit. As explained above, the UDP check sum is used to identify the data packet as a data packet that can be attenuated. The number record specifies how many affinity value records are contained in the AP header.

The affinity value is e.g. coded in sixteen bits, allowing $2^{16}$ different affinity groups. Using this system, a multi-cast group can be divided up into subgroups. Every subgroup is assigned to a different affinity value. All subgroups of the multi-cast group are assigned to the same IP address. Using the affinity values, it is possible to select subgroups of the multi-cast groups to forward a part of the data of the data packet. The packet offset of the AP record determines which data of the payload were forwarded by the router using a next router that has the affinity value of the AP record. Different affinity values can have different packet offsets. The packet values determine the size of the attenuation of the data of the payload. The new length describes the length of the attenuated payload of the data corresponding to the affinity value. Each time the packet is attenuated, the AP checksum of an AP record is replaced by the new check sum value carried in the AP record. The UDP check sum never changes and is always zero.

The IP header and the IP records are generated at program step 205 by the first host. Depending on the embodiment, it is also possible that the first host H1 itself receives the data packets as shown in FIG. 2. In this situation, the first host H1 forwards the data packet to the first router R1 without processing the data packets. The data packet is forwarded to the first router R1 at program step 210. In the following program step 215, the first router R1 receives the data packet.

Figure 4:
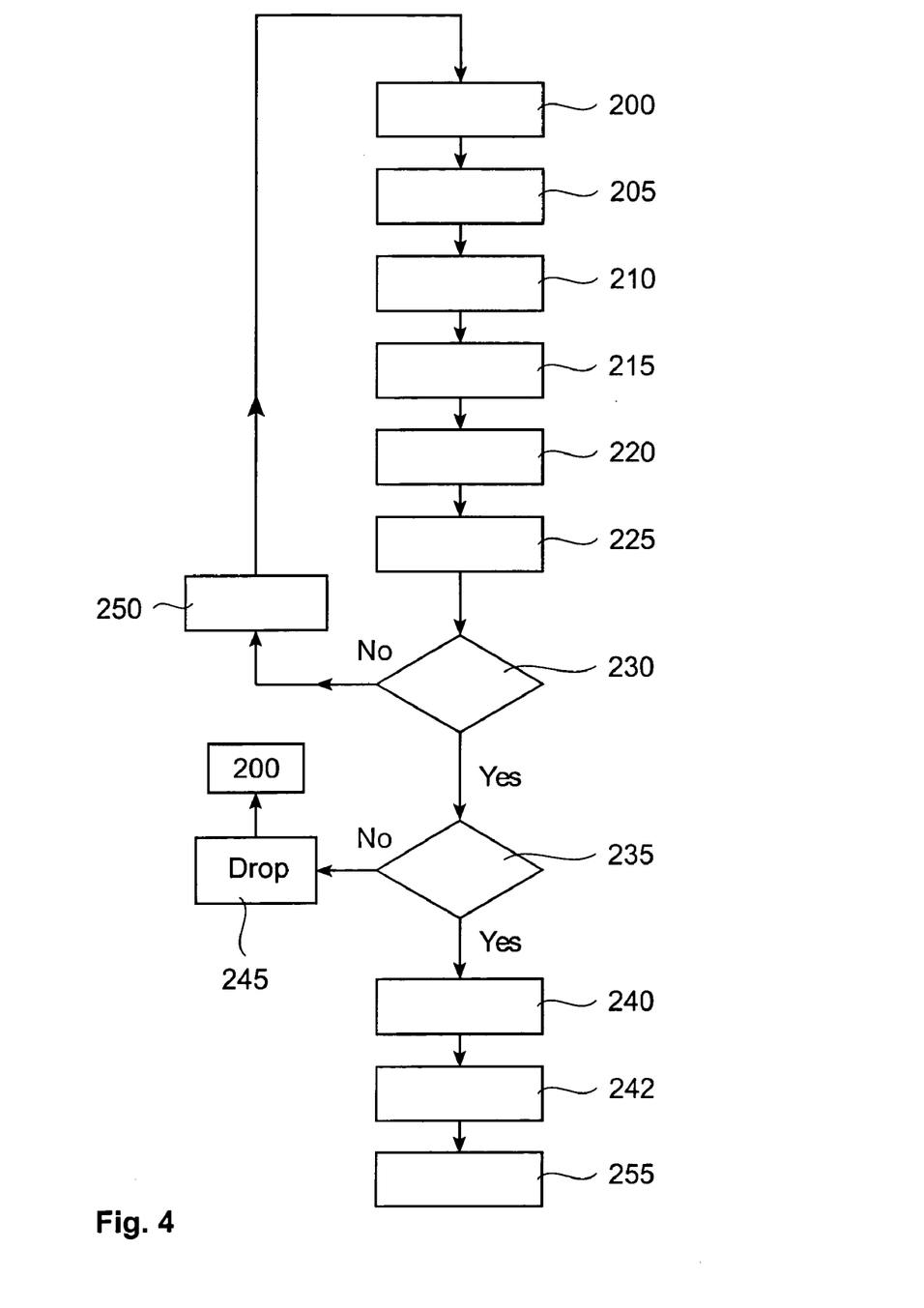
FIG. 4 shows in a flow chart a router process.

At the following program step 220, the first router R1 checks the destination IP address of the data packet. In this example, the IP destination address is the address of the second network 101. The first router R1 checks its look-up table to look for a next router that could be used for forwarding the data packets to the IP destination address of the data packets. The IP address table shows the next receivers, i.e. routers or hosts that can be used for sending a data packet to a destination address, the IP addresses of the next routers or hosts and the affinity values of the next routers or hosts. In this case, the first router R1 finds as a next receiver a second router R2 that is assigned to the IP destination address of the second group 101.

In the following program step 225, the first router R1 checks whether one of the next routers that are usable for forwarding the data packets to the IP destination address of the data packet are also assigned to an affinity value. The second router R2 is assigned to the first and second affinity value a, b.

At program step 230, the first router R1 checks whether the data packet comprises an affinity value. If the data packet comprises no affinity value, the first router R1 forwards the data packet to one of the next receivers that can be used for forwarding the data packet to the IP destination address of the data packet at the program step 250. After step 250, the program returns to the first step 200.

If, at the program step 230, the first router detects that the data packet comprises an affinity value, then the first router checks at the following program step 235 whether one of the receivers, i.e. next routers or hosts that can be used for forwarding the data packet to the IP destination of the data packet comprise the same affinity value as the data packet.

If, at program step 235, the first router recognizes that no next receiver that could be used for transmitting the data packet to the IP destination address is assigned to the same affinity value as the data packet then the first router drops the data packet at the following program step 245. After this, the program returns to the starting program step 200.

If, at program step 235, the first router R1 finds a match between the affinity value of the data packet and an affinity value of a next receiver that could be used for forwarding the data packets to the IP destination address of the data packet, then the first router R1 selects at the following program step 240 the next receiver, i.e. the next router or host, with the same affinity value.

After the program step 240, the router attenuates the data of the payload of the data packet at program step 242. The manner in which the data of the payload has to be reduced is determined by the affinity value. For example, the affinity protocol (AP) record comprises a packet offset that determines that only predetermined data of the payload are forwarded. Instead of using an offset, more complex ways to reduce the data of the payload could be used. After program step 242, the program step 255 is processed.

In the following program step 255 the router forwards the attenuated data packet to the selected next receiver. The program returns to step 200.

If there are several matches at program step 235, the router selects the best next receiver at program step 240. The best next receiver could be the receiver with the affinity value that allows the greater reduction of the payload. However, there may also be other rules for choosing the next receiver depending on the affinity value. In a preferred embodiment, every router comprises a table that shows an order of affinity values that determines which of the affinity values is the better one.

If, at program step 240, the router selects a next receiver that is assigned to a first and a second affinity value and the data packet is also assigned to a first and a second affinity value, the router selects one of the affinity values for determining the manner of attenuation of the data of the payload of the data packet. For deciding which of the affinity values is better, the router has a table that shows an order of the affinity values. The router checks the table and decides whether the first or the second affinity value is the better one. If the first affinity value is the best, the router uses the packet offset of the AP record of the first affinity value for attenuating the data of the payload of the data packet. In a simple example, this affinity value is better that allows a greater reduction of the data of the payload of the data packet. However, there might also be other rules for deciding which of the affinity values is best.

In the present example, the data packet comprises the first affinity value a and the first router R1 finds as a possible next receiver to forward the data packet to the IP destination address of the data packet the second router R2. Furthermore, the second router R2 is also assigned to the first affinity value a. Therefore, the first router R1 attenuates the data packet according to the first affinity value and forwards the attenuated data packet to the second router R2.

The second router R2 receives the data packet at the second interface P2 and using the program of FIG. 4 only finds the third router R3 to forward the data packet to the IP destination address of the second sub-network 101. Furthermore, the third router R3 is also assigned to the first and second affinity values a, b. Therefore, the second router R2 forwards the attenuated data packet to the third router R3. The third router R3 also uses the flow diagram of FIG. 4 and only finds the fourth router R4 that can be used for transmitting the data packet to the given IP destination address of the data packet. The fourth router R4 is assigned to the first and second affinity values a, b. Therefore, the third router R3 forwards the data packet to the fourth router R4. The fourth router R4 is connected with hosts that belong to the second sub-network 101. Therefore, in this example all the hosts H4, H5, H6 of the network are assigned to the same IP address. The IP destination address equals the IP address of the sub-network 101. In this case, the fourth router R4 works as shown in the program of FIG. 4. The fourth router R4 only finds the fourth host H4 that can be used for transmitting the attenuated data packet, because only the fourth host H4 is assigned to the first affinity value a. The fifth and sixth host H5, H6 are assigned to the second affinity value b. The different affinity values define different subgroups within the second sub-network 101. The fourth router R4 forwards the data packet to the fourth host H4 using the sixth interface P6. The fifth and the sixth host H5, H6 define a second subgroup within the second sub-network 101. The fourth host H4 belongs to a first subgroup within the second sub-network 101.

Figure 5:
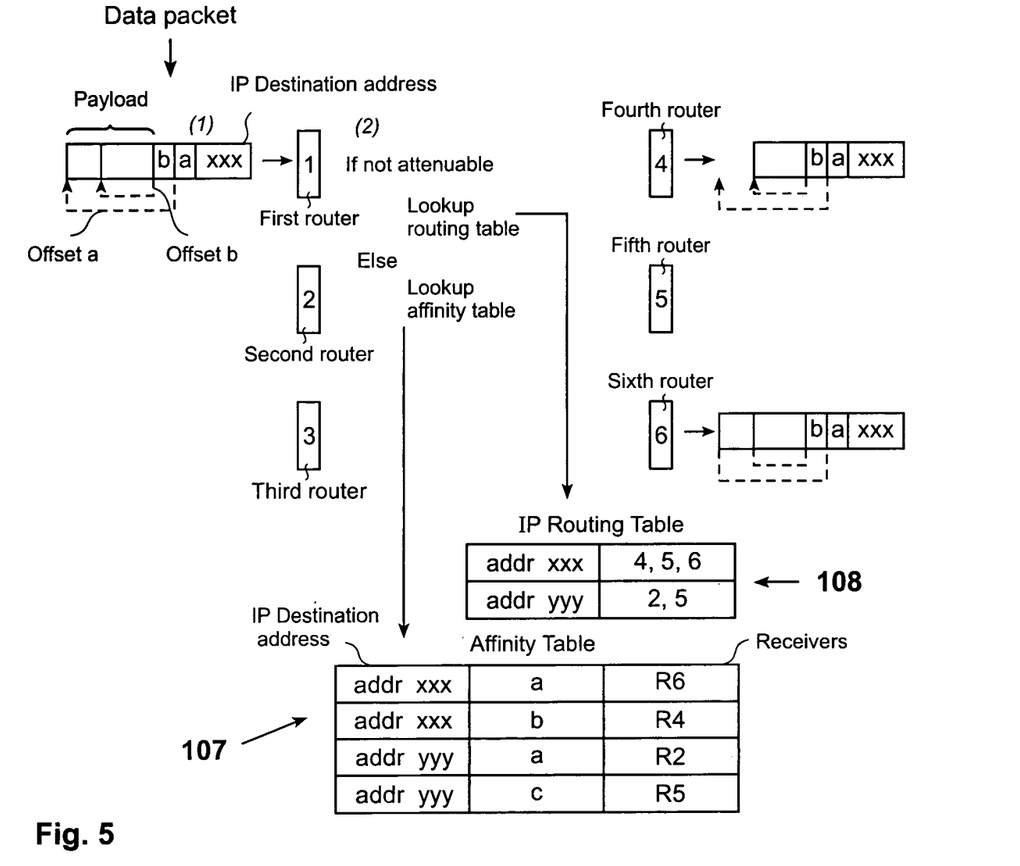
FIG. 5 shows a flow diagram of forwarding a data packet by router.

FIG. 5 shows another example for processing data packets by a router. The data packets comprise the features as shown in FIG. 2, but in FIG. 4 only the features are shown that are important for the understanding of the processing of the router. The data packet comprises an IP destination address that in this example is XXX. Furthermore, the data packet comprises the first affinity value a and the second affinity value b. Eventually, the data of the payload of the data packet is shown. The second affinity value b comprises the second offset b and the first affinity value comprises a first offset a.

FIG. 5 shows the steps of attenuating the payload of the data packet in detail. At a first step, the data packet arrives at a first router R1. At a second program step, the first router R1 determines wether the data packet is attenuable, as shown above. Since the data packet comprises two affinity values, the data packet is attenuable. Then the first router R1 looks up the affinity table 107 and finds that the data packets with the first affinity value a should be sent to a sixth router R6. The data packets with the second affinity value b should be sent to a fourth router R4. Also, the fifth router R5 according to a normal IP routing could be used. There is no affinity value registered for the fifth router R5. An IP routing table 108 shows that data packets with the IP destination address XXX could be forwarded by the fourth, the fifth and the sixth router R4, R5, R6. Data packets with an IP destination address YYY could be sent to a second or a fifth router R5. In this example, the first affinity value a has a longer offset that results in a larger size of the attenuated packet than with the second affinity value b. Therefore, the first router R1 attenuates the payload of the data packet until the second offset b of the packet is sent. Therefore, only the data of the payload within the second offset b is sent to the fourth router R4. Nothing is sent to the fifth router R5 and to the sixth router R6.

In a preferred embodiment of the invention, there are several affinity values associated with a packet. There is an order in the affinity values defined by the size of the resulting packet after the packet is attenuated. For example, a first affinity value a results in a packet of the size S1 and with a second affinity value b, a data packet results in a packet of size S2 after attenuation. The first size S1 is larger than the second size S2. There are then two possibilities for a packet: either the data packet is the first size S1 and contains the first and the second affinity value or the data packet has the second size S2 and contains the affinity value records for the second affinity value, for example, if the data packet has already been attenuated. In the first case, if the next router requires either a first or a second affinity value, then the data packet is attenuated in the appropriate way and forwarded. In the second case, if the next router requires the second affinity value, the data packet is forwarded untouched. If in the second case the router requires the first affinity value, the data packet is dropped and not forwarded.

In a preferred embodiment of the invention the host registers the affinity values with its local next routers to which they are connected. The router associates the affinity values of the hosts with the hosts. A router exchanges a complete list of all affinity values of its next receivers, i.e. hosts and routers to all connected routers. A router receiving a list of affinity values from another router registers the affinity values for the next router from which the affinity values were received by the router. In a preferred embodiment of the invention, a registration of the affinity values is periodically refreshed.

In a preferred embodiment, the invention is used in an IP multi-cast system. In a multi-cast system a destination address of a data packet corresponds to a multi-cast group rather than a single network location. The multi-cast group forwarding function returns a set of receivers i.e. routers and hosts to the router. In packet filtering, the router determines to which receivers the data packets should be forwarded based on information that is carried in the data packet. One of the new functions of the router is packet attenuation. For processing the packet attenuation, the router takes a packet to be forwarded and attenuates data of the data packet based on information contained in the packet and combined with information associated with the destination.

A router forwards data packets without affinity information to all members of the multi-cast group. If the data packet comprises an affinity value, the router forwards the data packet on the port that is assigned to the same affinity value. Assigning a receiver to an affinity value means that when using the receiver a data packet can be delivered to a host that comprises the same affinity value as the data packet.

If different levels of information can be identified within an application, then the affinity values can be used to determine which of the receivers, i.e. routers and hosts will receive which type or level of information. As shown in FIG. 1, the multi-cast sub-network 101 comprises a first and a second subgroup sub1, sub2. The two subgroups are assigned to different affinity values. The first subgroup sub1 is assigned to the first affinity value a and the second subgroup sub2 is assigned to the second affinity value b. Using this system, a hierarchy of information delivering system can be applied. The levels of information may include different confidential levels for confidential information. Furthermore, the levels of information could also define different parts of information or different qualities of information. If there is, e.g. a data stream carrying video and audio data packets, then the video data packets might have an other affinity value than the audio data packets. If there are hosts within the multi-cast sub-network 101, that only want to use audio packets, then the hosts were assigned to the affinity value that allows only delivering the audio data packets to this subgroup.

The invention may also be used for a multi-layer encoded non-continuous media stream, e.g. for a distributed computer game. A distributed computer game is played simultaneously by several players using different hosts. The level of information could be used for revealing different information about an event of the computer game. If there is an event, a first subgroup of hosts of players that are within a virtual location of the event is assigned to a first layer of the encoding of the computer game. The first layer receives e.g. a loud bang for the event. The players receive different information depending on the virtual location they are in. In a preferred embodiment, the hosts of the players send information to the other players that play the same game online. For example, a first player A within a virtual location X sends more information to a second player B, who is also in the virtual location X, than to a third player C, who is in a virtual location Y, using the described method of attenuation. The second player B then receives data from a second encoding layer. The second encoding layer receives the information of the first layer and comprises a supplemental information, i.e. that there is a flash. A third layer comprises the information of a second layer and the information that the electricity of the house is shorted. The players that are within the virtual location of the house receive the information of the first and the second layer and the information that the electricity of the house is shorted.

The inventive method and system is therefore also advantageous for playing a distributed computer game. Using the affinity values, the data that is transmitted to the hosts is reduced. If a first player changes the virtual location, the host of the first player sends the information to the other hosts that are playing the game, that the host of the first player is now assigned to a further affinity value or another affinity value. With the other affinity value the host receives data of a higher encoded level. This shows that the inventive method and system also reduces the data that have to be transmitted to the players depending on the affinity value, whereby the affinity value depends for example on the virtual location situation the player is in during the game.

In a preferred embodiment the players only receive the information they are supposed to receive, reducing the possibility of cheating, e.g. changing the software at the end so that a player can take advantage of the additional information he received by changing the software.

The invention claimed is:

1. A method for transmitting a data packet by a router, wherein the router performs said method which comprises the steps of:
   determining a receiver for the data packet;
   checking an affinity value of the data packet;
   attenuating a payload of the data packet depending on the affinity value of the data packet;
   checking an affinity value assigned to the determined receiver; and
   sending the attenuated data packet to the determined receiver, if the determined receiver shows the same affinity value as the data packet.

2. A method according to claim 1, whereby the router comprises a table in which affinity values of receivers are stored, whereby the router compares the affinity value of the data packet with the affinity values of determined receivers stored in the table and selects determined receivers that have the same affinity value as the data packet, and whereby the router sends the data packet to at least one of the selected receivers.

3. A method according to claim 1, whereby the router drops the data packet if no receiver shows the same affinity value.

4. A method according claim 1, whereby the router attenuates the data packet in two different ways, when a data packet comprises two affinity values and the router finds a first receiver that has the first affinity value and a second receiver that has the second affinity value, by creating a first and a second attenuated data packet, whereby the two attenuation methods are determined by the first and the second affinity value, and whereby the router sends the first attenuated data packet to the first receiver with the first affinity value and the second attenuated data packet to the second receiver with the second affinity value.

5. A method according claim 1, whereby, when a data packet comprises a first and a second affinity value, whereby the first affinity value determines a greater attenuation of the payload of the data packet than the second affinity value, the router attenuates the payload of the data packet according to the first affinity value and sends the attenuated data packet to the receiver showing the first affinity value.

6. A method according to claim 1, wherein the data packet comprises video and audio data, wherein the data packet comprises a first and a second affinity value, wherein the first affinity value determines only the audio data to be transmitted by the router and the second affinity value determines only the video data to be transmitted by the router.

7. A method according to claim 1, wherein the data packets are used for sharing information at the same time with several hosts.

8. A method according to claim 1, wherein the data packets are used for sending different information to different hosts that are used for playing a computer game with several players and that the affinity values are used for selecting different information for different players.

9. A method according to claim 7, wherein the affinity values are used for determining different levels of information, i.e. depending on different virtual locations the players are in.

10. A method according to claim 1, wherein a UDP checksum of the data packet is compared with a predetermined value and the data packet is recognized as an attenuable data packet if the UDP checksum equals the predetermined value, wherein the data packet comprises an AP checksum and the AP checksum is calculated to such a value to get an UDP checksum that is equal to the predetermined value if the data packet should be marked as an attenuable data packet.

11. A method for transmitting a data packet in a communications network, said method comprising:
   determining a receiver for said packet;
   determining an affinity value for said packet;
   attenuating a payload of said packet depending on its affinity value;
   determining an affinity value assigned to said determined receiver; and
   transmitting said attenuated packet to said receiver if said determined receiver has the same affinity value as said packet.

* * * * *